UNITED STATES PATENT OFFICE.

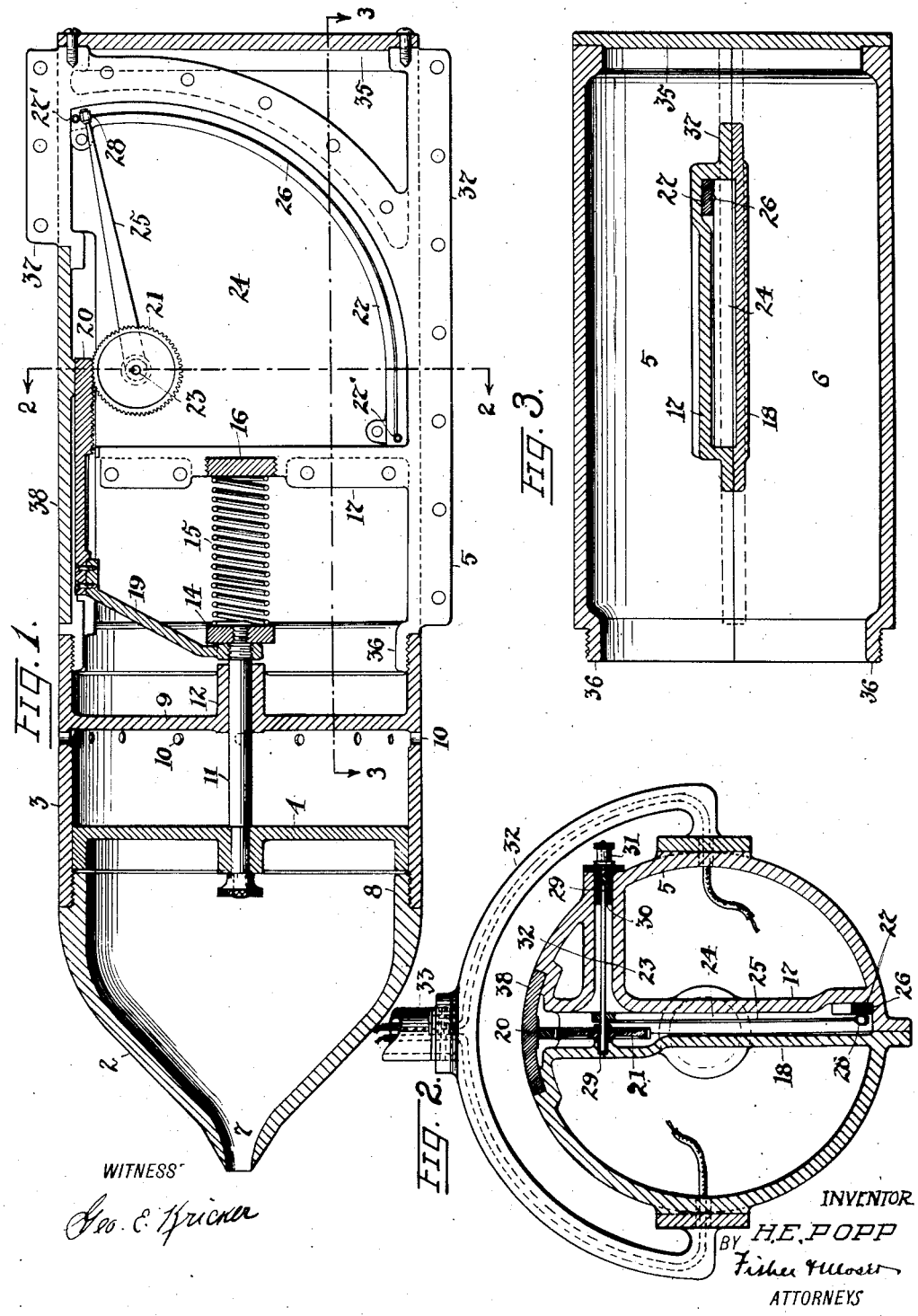

HARRY E. POPP, OF CLEVELAND, OHIO.

CURRENT-METER.

1,209,024.  Specification of Letters Patent.  Patented Dec. 19, 1916.

Application filed April 5, 1915. Serial No. 19,153.

*To all whom it may concern:*

Be it known that I, HARRY E. POPP, a citizen of the United States, residing at Cleveland, in the county of Cuyahoga and State of Ohio, have invented certain new and useful Improvements in Current-Meters of which the following is a specification.

My invention relates to improvements in current meters, and the improvements comprise the simple and practical means herein shown and described and more particularly pointed out in the claims, whereby the flow of water in large pipes, open channels or rivers, may be gaged and measured with accuracy and despatch.

In the accompanying drawings, Figure 1 is a sectional view longitudinally through the central axis of the device, and Fig. 2 is a transverse section on line 2—2, Fig. 1. Fig. 3 is a longitudinal section on line 3—3, the front parts being omitted.

One accepted way of gaging the flow of water in large pipes, open channels or rivers, is by means of a current meter comprising a series of vanes or cups mounted on the periphery of a wheel which is immersed in the stream to cause the wheel to revolve. At every certain number of revolutions of the wheel an electrical contact is made to produce an audible signal to an observer who is thereby enabled to maintain a count of the number of revolutions of the wheel and to estimate the velocity of flow of the water. Although several approximate methods of using this instrument for more rapid determinations of the mean velocity of the stream are in vogue, the most usual and also the most exact method for accurate work known to me consists in placing the meter at many different points in the cross section of the stream, allowing it to remain at each point long enough to enable the observer to determine the number of revolutions of the wheel per minute and thereby the velocity of the water at that point. Unless these points are so selected that the individual velocities determined, may be taken to represent the average velocity over equal portions of the cross section of the stream, which is only possible when the cross section is a regular figure, the arithmetical means of all the velocities determined is not the true mean velocity of the stream. It is therefore necessary, usually, to select the points in horizontal or vertical lines and knowing their relative positions to plot a graphical chart showing the distance between points as a base, and the velocities at the points as ordinates, the average ordinate of the curve thus drawn representing the average velocity over the strip of area covered by these velocities. The objection to this method lies in the fact that since the meter must be left at each point for several minutes the time consumed in making a large number of determinations is very considerable. A further objection is the very great error which is often introduced by the effect of eddies and cross currents on the speed of the meter.

The purpose of my invention, therefore, is to provide an instrument which will be acted upon very nearly only by the component of the velocity at right angles to the cross section of the channel, and which if a suitable recording mechanism were used but which is not shown herein would produce a graphical chart showing the velocity of the water at every point in a portion of the cross section of the channel as the meter is raised or lowered vertically therein.

The instrument is based on the well known hydraulic phenomenon that a stream of water or other fluid impinging on a small tube having the plane of the entering orifice opposed to the direction of flow will exert in that tube a pressure equal to the sum of the velocity head and the pressure head of the water at that point; also that a small tube with the plane of the entering orifice parallel to the direction of flow will have exerted in it a pressure equal or proportional only to the pressure head of the water at that point. It is evident therefore that by connecting these two tubes or two equivalent openings to separate chambers on opposite sides of a plunger, a force will be exerted on the plunger equal to the difference between the two pressures, which is simply the velocity head. Thus, the velocity head plus pressure head minus pressure head equals velocity head. In brief, it is this principle which I utilize to provide a new type of meter comprising a tubular casing having a removable front nozzle section 2, an intermediate cylinder 3 for a reciprocable plunger 4, and a rear section which is divided longitudinally into two parts, 5 and 6, respectively, to provide a housing for suitable electrical resistance mechanism adapted to be operated by plunger 4. Nozzle section 2 is more or less pointed and has a relatively small intake mouth 7 axially thereof at its front end, and a screw-threaded extension 8 at its rear end engages cylinder 3. A transverse diaphragm 9 closes the rear end of cylinder 3, but the cylinder is otherwise open to the entrance of water by way of a series of orifices 10 in the cylinder wall located in front of diaphragm 9. The plunger rod 11 extends through the central boss portion 12 of diaphragm 9 and its inner screw-threaded end carries the thrust collar 14 of a coiled spring 15 which bears at its opposite end against a seat 16 at the front end edges of the middle cross walls 17 and 18 of the two rear housing sections 5 and 6, respectively. Plunger rod 11 also carries an upright arm 19 having a rearwardly extending rack bar 20 in gear connection with a small gear 21 mounted on a transverse shaft 23 in the upper portion of the shallow chamber 24 for the spring contact arm 25 and the curved resistance wire 26 which is seated in the flat side of a curved segment bar 27 made of porcelain or other suitable insulating material. The opposite ends of resistance wire 26 are secured to binding posts 27' insulated from the casing, and a rolling contact is established with wire 26 by a roller 28 on the end of arm 25. The shaft 23 for this arm is insulated from the casing by bushings 29 made of suitable insulating material, and a metal bearing 30 and binding nut 31 are provided for one end of the shaft centrally in one of said bushings at the outside of the casing, the said shaft extending through a transverse passage 32 in the casing section 5, see Fig. 2. An insulated electrical conductor or cable may be attached to binding post 31 and similar conductors to each binding post 27', these conductors passing through the carrying yoke 32 and its rod 33, which jointly support the instrument at any depth in a stream of water, and are made tubular and hollow to provide a conduit for the electrical connections, see dotted lines, Fig. 2.

The rear end of the casing is closed by a separate plate 35, which when screwed in place, also holds the two sections 5 and 6 together, and the front ends of said sections 5 and 6 have reduced screw-threaded neck portions 36 adapted to make screw engagement with the rear end of cylinder 3. Flanges 37 on sections 5 and 6 afford further means of bolting or screwing them together, and a removable top plate 38 covers chamber 24 and affords a guide for rack bar 20, also permitting access for dismantling. The separate compartment 24 isolates the resistance wire 26 and oscillatory contact arm 25 from any water taken into the larger surrounding compartment within sections 5 and 6; in fact, the water level would have to rise to the rack bar 20 compressing the entrapped air before effecting entrance into compartment 24.

In operation, the total head of water (velocity and pressure) is admitted to the forward side of the plunger 4 through the nozzle mouth 7, and the pressure head only is admitted to the rear side of the plunger 4 through the orifices 10 in the side of the meter casing. The unbalanced force on the plunger, then, which is proportional to the velocity head of the water, is resisted by spring 15 so that a movement of the plunger backward or forward takes place as the velocity of the water impinging on the opening in the front of the meter increases or decreases, the amount of movement being proportional to the change in velocity head. To increase the accuracy of the instrument, several interchangeable springs would be provided, weaker ones for low velocities and stronger ones for the higher ranges.

The proportional movement of the plunger to the changes in velocity head of the water is recorded on a chart by suitable electrical reproducing and recording mechanism located at the surface of the water and electrically connected to the resistance wire 26 and arm 25. In other words, the movement of plunger 4 is transmitted to arm 25 having sliding engagement with wire 26 to produce variable current in the electrical circuit contained in the reproducing and recording mechanism which is operatively controlled thereby to work in synchronism with the plunger and indicate or record the movement on a suitable chart. After the springs have been properly calibrated any position of the plunger will correspond to a definite velocity of the water and to a definite position of the marking point in the recording mechanism.

What I claim is:

1. An instrument for determining the velocity of a stream of water, comprising a tubular body having a plunger adapted to reciprocate therein and provided with openings in its walls on opposite sides of said plunger to subject the plunger to the velocity head and pressure head of the stream, and electrical means having operating connections with said plunger to transmit the variable movements of said plunger when the instrument is immersed.

2. An instrument for the purposes described, comprising a tubular body having a reciprocable plunger therein, and chambers on opposite sides of said plunger in open communication with the front end and side exterior of said body, and provided with a sealed chamber at its rear, in combination with an electrical resistance device confined within said rear chamber and actuating connection between said plunger and device.

3. A current meter, comprising a perforated cylinder having a plunger therein and a nozzle in advance of the plunger and provided with a compartmented section at its rear, in combination with an electrical device confined within said compartmented section having a movable contact member and means to operate said member by the movement of said plunger.

4. In a current meter, a cylinder having a side opening and a plunger within said cylinder, an intake nozzle at the front of said cylinder, a hollow rear section for said cylinder, a plunger shaft extending into said hollow rear section, electrical resistance means having a movable contact arm in operative connection with said shaft, and a spring to force the plunger toward the front end of said cylinder.

5. In a device substantially as described, a cylinder having orifices in its side and an intake nozzle at its front end, a plunger within said cylinder, a shaft and operating spring for said plunger, a compartmented rear section for said cylinder, an electrical resistance wire and contact member engaged therewith within said rear section, and operating connections for said member engaged with the plunger shaft.

6. An instrument for gaging the flow of a liquid comprising a cylinder having orifices annularly thereof, a spring pressed plunger within said cylinder, a detachable front nozzle for the cylinder having a relatively small intake mouth, a sectional rear extension for the cylinder having a separate compartment on the median line thereof, a resistance wire and an oscillatory contact arm therefor mounted in insulated position within said compartment and geared connections between said arm and plunger.

7. A submersible device for determining the velocity and discharge of a stream, comprising a perforated cylinder having a contracted intake nozzle at one end, a reciprocable plunger adjacent said nozzle, a spring backing for said plunger, a variable electrical resistance having a shifting contact member coupled to said plunger, electrical connections for said resistance, and means to support said device within a stream.

In testimony whereof I affix my signature in presence of a witness.

HARRY E. POPP.

Witness:
  GEO. E. KRICKER.